United States Patent
Klimmek

(10) Patent No.: US 11,209,785 B2
(45) Date of Patent: Dec. 28, 2021

(54) FRONT ADAPTER FOR CONNECTING TO A CONTROL DEVICE AND AUTOMATION SYSTEM

(71) Applicant: Phoenix Contact GmbH & Co. KG, Blomberg (DE)

(72) Inventor: Benjamin Klimmek, Aerzen (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 16/487,757

(22) PCT Filed: Feb. 16, 2018

(86) PCT No.: PCT/EP2018/053929
§ 371 (c)(1),
(2) Date: Aug. 21, 2019

(87) PCT Pub. No.: WO2018/153790
PCT Pub. Date: Aug. 30, 2018

(65) Prior Publication Data
US 2019/0391548 A1    Dec. 26, 2019

(30) Foreign Application Priority Data
Feb. 21, 2017 (DE) .................... 10 2017 103 554.0

(51) Int. Cl.
*H04L 29/10* (2006.01)
*G05B 19/042* (2006.01)
(Continued)

(52) U.S. Cl.
CPC ......... *G05B 19/0423* (2013.01); *G05B 19/05* (2013.01); *H04L 12/40032* (2013.01);
(Continued)

(58) Field of Classification Search
CPC ................ G05B 19/0423; G05B 19/05; G05B 2219/25428; G05B 2219/33192; H04L 12/40032; H04L 29/10; H04W 88/06
See application file for complete search history.

(56) References Cited

U.S. PATENT DOCUMENTS

2005/0091437 A1* 4/2005 Yang .................. G06F 13/4045
710/313
2007/0168648 A1* 7/2007 Mardiks ................. G06Q 50/12
712/36
(Continued)

FOREIGN PATENT DOCUMENTS

DE      102004029022 A1    2/2005
EP         1925918 A2       5/2008
(Continued)

OTHER PUBLICATIONS

Authorized Officer Nora Linder, English Translation of International Preliminary Report on Patentability dated Sep. 6, 2019 in PCT International Application No. PCT/EP2018/053929.
(Continued)

*Primary Examiner* — Tim T Vo
*Assistant Examiner* — Harry Z Wang
(74) *Attorney, Agent, or Firm* — Kaplan Breyer Schwarz, LLP

(57) ABSTRACT

A front adapter for connecting to a control device, has a connection device connected to a predetermined system cable for connecting at least one field component, at least one wireless communication interface for wirelessly transmitting and receiving signals to or from at least one wireless one transmitting and/or receiving device which can be connected to a first field unit, and/or at least one bus-capable communication interface for transmitting and receiving signals via a signal bus to or from at least one bus-capable transmitting and/or receiving device which can be connected
(Continued)

to a second field device, and a control and/or evaluation device which is adapted to control the transmitting of signals between the control device and the at least one wireless transmitting and/or receiving device and/or the at least one bus-capable transmitting and/or receiving device.

11 Claims, 2 Drawing Sheets

(51) Int. Cl.
G05B 19/05 (2006.01)
H04L 12/40 (2006.01)
H04W 88/06 (2009.01)

(52) U.S. Cl.
CPC ............ *H04L 29/10* (2013.01); *H04W 88/06* (2013.01); *G05B 2219/25428* (2013.01); *G05B 2219/33192* (2013.01)

(56) References Cited

U.S. PATENT DOCUMENTS

| | | | |
|---|---|---|---|
| 2011/0125601 A1* | 5/2011 | Carpenter | G06Q 30/0631 705/26.1 |
| 2012/0057694 A1 | 3/2012 | Lee | |
| 2013/0262883 A1* | 10/2013 | Saunders | G06F 1/3278 713/300 |
| 2014/0281113 A1* | 9/2014 | Trethewey | G06F 13/387 710/317 |
| 2015/0066979 A1* | 3/2015 | Zhang | G06F 16/245 707/769 |
| 2018/0143932 A1* | 5/2018 | Lawless | G06F 13/4068 |

FOREIGN PATENT DOCUMENTS

| | | |
|---|---|---|
| WO | 2011/098543 A1 | 8/2011 |
| WO | 2015/110476 A1 | 7/2015 |

OTHER PUBLICATIONS

Authorized Officers: Voye-Piccoli, Alexandra and Messelken, M, International Search Report and Written Opinion issued in PCT application No. PCT/EP2018/053929, dated May 18, 2018, 11 pp.

Office Action issued in counterpart German patent application No. 102017103554.0, dated Dec. 7, 2017, 8 pp.

* cited by examiner

FRONT ADAPTER FOR CONNECTING TO A CONTROL DEVICE AND AUTOMATION SYSTEM

FIELD

The invention relates to a front adapter for being connected to a control device, which can be used in particular in an industrial automation system, and also relates to an automation system.

BACKGROUND

It is known to connect sensors and actuators to the I/O level of a control system in wired manner. Such control systems use so-called front adapters which define the interface between a controller and the I/O level. In this case, the actuators and sensors can be connected to the front adapter of a controller of the control system via a system cable.

Such a control technology connection adapter system is known from WO 2015/110476 A1, for example, in which I/O devices can be connected to an input and/or output unit of a control device by means of a system cable which is connected to a front adapter at one end thereof. In order to enable wireless transfer of digital and/or analog signals between the input and/or output unit of the control device and at least one I/O device, WO 2015/110476 A1 proposes to replace the system cable by a front adapter and a field-side adapter, each of which are configured for wireless transfer of digital and/or analog signals.

From DE 10 2004 029 022 A1, a process control system is known, which includes a control device. The control device can be connected to a wireless I/O interface to be able to communicate with wirelessly supplied field devices. In addition, the control device can be directly connected to wired field devices.

From US 2012/0057694 A1 a connection device is known which comprises a combo port with a plurality of electrical contacts. For example, the combo port supports the two connection standards RJ-45 and RJ-11. Furthermore, the connection device comprises detection means capable of identifying the connection standard of an inserted RJ-45 or RJ-11 connector. Depending on the identified connection standard, the respective contacts of the combo port are connected to a connection module.

SUMMARY

The invention is based on the object to provide a front adapter for a control device and an automation system that allow in a simple and cost-effective way to flexibly integrate field devices of any manufacturer into an automation system.

What can be considered as a key idea of the invention is to transmit the output signals of a control device to field devices of different manufacturers via different transmission media depending on the required safety and security, for example, and to bundle input signals from field devices of different manufacturers, which are connected to different transmission media, and forward them to input contacts of the control device in targeted manner.

In this way it is possible to connect, to the control device, even field devices which are not configured for being wired to a predetermined system connector.

The technical problem stated above is solved, on the one hand, by the features of claim 1.

Accordingly, a front adapter is provided for being connected to a control device such as a programmable logic controller (PLC) or a distributed control system (DCS), for example. The front adapter comprises a connection device connected to a predetermined system cable. The system cable can be used to connect to the control device to at least one field component, such as a field transfer component or a field device. The connection device has first contact elements that are electrically connectable to first I/O contact elements of an input/output assembly of the control device. Furthermore, the front adapter has at least one wireless communication interface for wirelessly transmitting and receiving signals to or from at least one wireless transmitting and/or receiving device that can be connected to a first field device.

The first field device may but need not be configured for connection to the predetermined system cable. Usually, however, this will be a field device which is not configured for being connected to the predetermined system cable.

Alternatively or additionally, the front adapter has a bus-capable communication interface for transmitting and receiving signals via a signal bus to or from at least one bus-capable transmitting and/or receiving device that can be connected to a second field device. The second field device, too, may but need not be configured for being connected to the predetermined system cable. Furthermore, the front adapter comprises a control and/or evaluation device that is connected to the wireless and/or bus-capable communication interfaces and to second contact elements, wherein the second contact elements of the front adapter can be connected to second I/O contact elements of the input and output assembly of the control device. The control and/or evaluation device is adapted to control the transfer of signals between the second I/O contact elements of the input and output assembly and the at least one wireless transmitting and/or receiving device and/or the at least one bus-capable transmitting and/or receiving device According to an advantageous embodiment, each wireless and/or bus-capable transmitting and/or receiving device has a unique address assigned thereto. Now, the control and/or evaluation device is adapted to control the transfer of signals between the second I/O contact elements of the input and output assembly and the at least one wireless transmitting and/or receiving device and/or the at least one bus-capable transmitting and/or receiving device in response to these addresses. Advantageously, the at least one wireless communication interface is adapted for optical signal transfer or for wireless transfer, and the bus-capable communication interface is adapted for connecting a signal bus. A wired fieldbus or a data bus can be used as the signal bus.

In order to allow the front adapter and in particular the control and/or evaluation device to be parameterized and/or configured, a wireless or wired interface may be provided. The wireless interface may be based on the NFC or Bluetooth standard, for example.

Power supply of the front adapter and in particular of the control and/or evaluation device may be achieved using an internal power supply source. Alternatively or additionally, the front adapter may have an interface for connecting an external power supply source.

The front adapter is preferably provided in the form of a plug-in connector whose first and second contact elements can be mated with the first and second I/O contact elements of the input and output assembly.

The technical problem stated above is also solved by the features of claim 7 on the other hand.

Accordingly, an automation system is provided, which comprises a front adapter according to any one of claims 1 to 6, which is connected to a control device. Furthermore, the automation system comprises at least one wireless transmitting and/or receiving device which is connected to a first field device and is adapted for wireless communication with the front adapter in order to enable communication between the first field device and the control device.

Alternatively or additionally, the automation system comprises at least one bus-based transmitting and/or receiving device which is connected to a second field device and is adapted for bus-based communication with the front adapter.

According to an advantageous embodiment, the at least one wireless transmitting and/or receiving device and/or the at least one bus-capable transmitting and/or receiving device is arranged in a respective separate housing and is adapted for being externally connected to the respective field unit assigned to it.

Alternatively, the at least one wireless transmitting and/or receiving device and/or the at least one bus-capable transmitting and/or receiving device may be implemented within the respective field device assigned to it.

Each of the first and/or second field devices may be an actuator or a sensor.

The first and second field devices may but need not be configured for being connectable to the system cable.

The automation system may comprise field components, such as a field transfer component or third field devices which are configured for being connected to the system cable.

The front adapter according to the invention makes it possible to communicate via different transfer media, namely the predetermined system cable, a wireless transfer medium, or a bus-based transfer medium, depending on different security and safety requirements of the field devices.

BRIEF DESCRIPTION OF THE DRAWINGS

The invention will now be explained in more detail by way of an exemplary embodiment in conjunction with the accompanying drawings, wherein.

DETAILED DESCRIPTION

Figure 1:
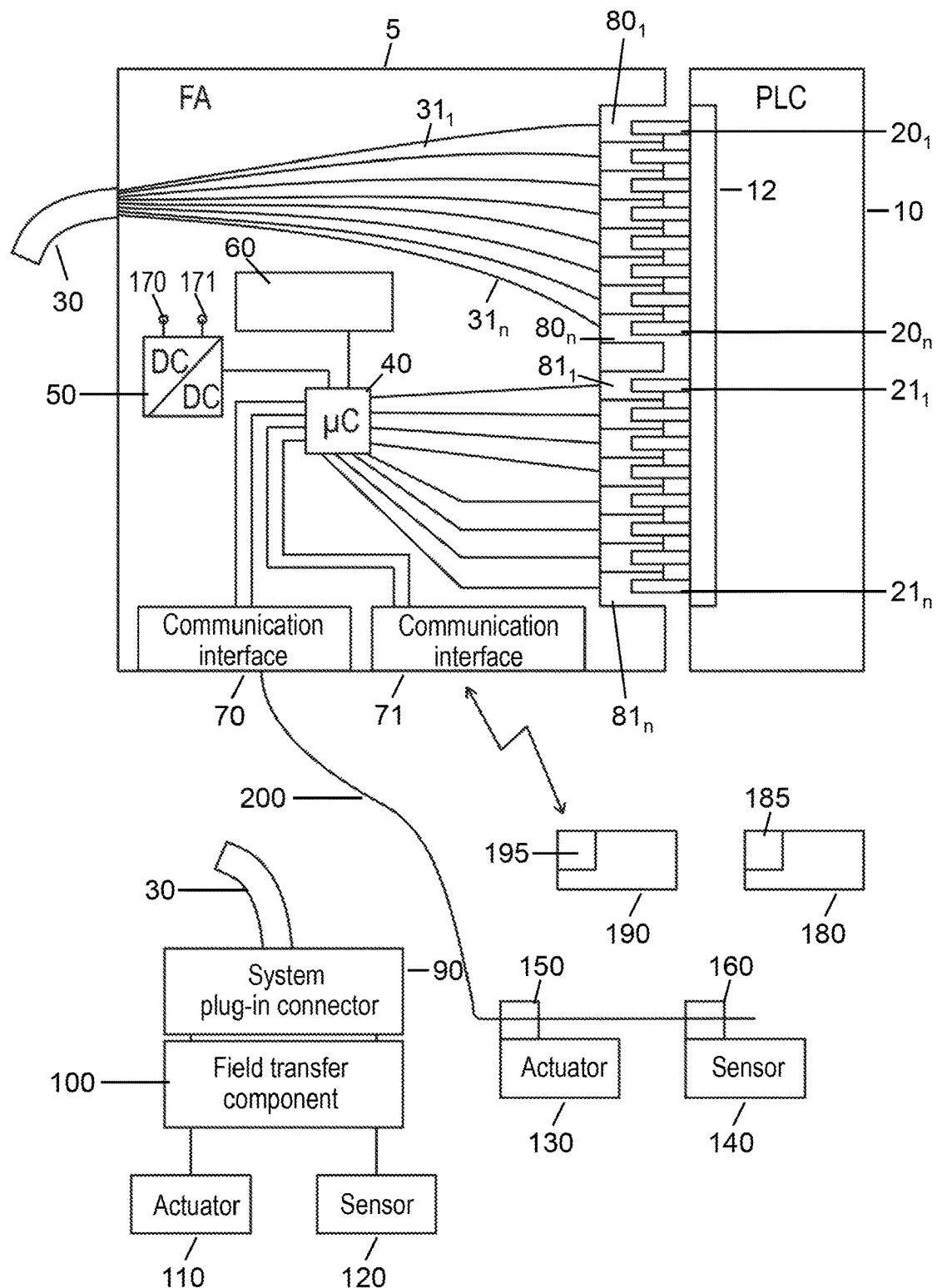
FIG. 1 shows an exemplary automation system in which the invention is implemented.

FIG. 1 shows an exemplary, preferably industrial automation system 1 which comprises at least one control device 10 that may be implemented as a PLC or DCS, for example. Control device 10 comprises at least one input and output assembly 12 which is adapted to receive analog and/or digital input signals and to output analog and/or digital output signals. The input and output assembly 12 has first I/O contact elements $20_1$ to $20_n$ which are in the form of I/O pins in the present example. Furthermore, the input and output assembly 12 has second I/O contact elements $21_1$ to $21_n$ which may also be in the form of I/O pins.

For connecting field devices to the control device 10, a front adapter 5 is provided, which may be in the form of a plug-in connector and may be accommodated in a housing, for example.

Front adapter 5 has a connection device connected to a predetermined system cable 30. The connection device comprises first contact elements $80_1$ to $80_n$, each of which is electrically connectable to a respective one of the first I/O contact elements $20_1$ to $20_n$ of the input and output assembly 12 of control device 10. The first contact elements $80_1$ to $80_n$ of the connection device are configured complementary to the first I/O contact elements $20_1$ to $20_n$. In the present example, the first contact elements $80_1$ to $80_n$ of the connection device are implemented as socket terminals into which the corresponding I/O pins $20_1$ to $20_n$ can be inserted. The individual fibers or wires $31_1$ to $31_n$ of the predetermined system cable 30 are each connected to a respective one of the first contact elements $80_1$ to $80_n$.

As can be seen in FIG. 1, the predetermined system cable 30 has a system plug-in connector 90 at its end remote from the front adapter, which can be connected to a field component. A so-called field transfer component 100 can be used as a field component, to which a plurality of field devices can be connected. In the illustrated example, an actuator 110 and a sensor 120 are connected to the control device 10 via field component 100, system cable 30 and front adapter 5. However, it is also conceivable for field devices to be directly connected to the system cable 30.

The term "predetermined system cable" in particular points to the fact that the system cable is a cable of a particular manufacturer, so that in particular the system plug-in connector 90 has predefined structural and electrical properties. Therefore, only field components with complementary connectors can be connected to the system plug-in connector 90.

In order to be able to connect, to the control device 10, field devices which are either not adapted to be connected to the predetermined system cable 30, or which are intended to be arranged for example in an environment that must not be connected to the system cable 30 for safety and/or security reasons, or that cannot be connected to a cable at all, at least one wireless communication interface 71 is provided for wirelessly transmitting and receiving signals to or from at least one wireless transmitting and/or receiving device. In the present example, two transmitting and/or receiving devices 185 and 195 are shown, each of which is connectable to a field device 180 and 190, respectively. For example, field device 180 is a sensor and field device 190 is an actuator. According to an advantageous embodiment, wireless transmitting and/or receiving device 185 is implemented in sensor 180, while wireless transmitting and/or receiving device 195 is implemented in actuator 180.

The at least one wireless communication interface 71 is adapted for optical signal transfer or for wireless transfer, for example. For example, the communication interface 71 and the wireless transmitting and/or receiving devices 185 and 195 are configured for infrared data transmission. It is conceivable that a further wireless communication interface (not shown) may be provided alternatively or in addition to wireless communication interface 71, which may be able to communicate based on a wireless technology with appropriately configured wireless transmitting and/or receiving devices (not shown), for example.

As an alternative or in addition to the wireless communication interface 71, a bus-capable communication interface 70 may be implemented in the front adapter 5, for transmitting and receiving signals to or from at least one bus-capable transmitting and/or receiving device via a signal bus. For the sake of simplicity of illustration, two transmitting and/or receiving devices 150 and 160 are shown by way of example, each of which is connected to a field device 130 and 140, respectively. It should be noted that the field devices 130, 140, 190, and 180 need not be configured for being connectable to the system cable 30.

As shown in FIG. 1 by way of example, the two bus-capable transmitting and/or receiving devices 150 and 160 are each arranged in a separate housing and are adapted for being externally connected to the field device 130 or 140, mechanically and electrically. Preferably, the bus-capable transmitting and/or receiving device 150 can be screwed to a corresponding terminal point of the field device 130 in order to establish a mechanical and electrical connection. Similarly, the bus-capable transmitting and/or receiving device 160 can be electrically and mechanically coupled to the field device 140. A communication interface configured for this purpose is designated by reference numeral 154 in FIG. 2.

As can be seen in FIG. 1, the two bus-capable transmitting and/or receiving devices 150 and 160 are each adapted to be connected to a signal bus 200 which may be a fieldbus, for example. Fieldbus 200 is connected to the bus-capable communication interface 70 which is implemented as a fieldbus communication interface. It should be noted that field device 130 may be an actuator and field device 140 may be a sensor.

In order to be able in particular to control the communication between front adapter 5 or control device 10 and the field devices 130, 140, 180, 190, the front adapter 5 has a control and/or evaluation device 40 which may be implemented as a programmable microcontroller or microprocessor, for example. Control and/or evaluation device 40 has contacts which are appropriately connected to the exemplary implemented communication interfaces 70 and 71 and to the second contact elements $81_1$ to $81_n$. The second contact elements $81_1$ to $81_n$ are configured complementary to the second I/O contact elements of the input and output assembly 12 of control device 10. Thus, in the present case the second contact elements $81_1$ to $81_n$ are in the form of socket terminals which, in the assembled state, are electrically connected to the second I/O contact elements $21_1$ to $21_n$ of control device 10.

An internal power supply source (not shown) can be used in order to be able to power the front adapter 5 and in particular the control and/or evaluation device 40. Additionally or alternatively, the front adapter has ports 170 and 171 to which an external power supply source can be connected, for example a DC power source. The DC voltage supplied by the external power supply source is supplied to the control and evaluation device 40 via a DC/DC converter 50.

Control and/or evaluation device 40 is adapted to control the transfer of signals between the second I/O contact elements $21_1$ to $21_n$ of the input and output module 12 and the wireless transmitting and/or receiving devices 185 and 195 and/or the bus-capable transmitting and/or receiving devices 150 and 160. If analog signals are exchanged, predetermined second contact elements $81_1$ to $81_n$ in the front adapter 5 have D/A or A/D converters associated therewith, depending on whether the input and output module 12 has analog outputs and analog inputs.

In order for the control and/or evaluation device 40 to be able to control communication between the control device 10 and field devices 130, 140, 180, and 190, each wireless transmitting and/or receiving device 185 and 195 and each bus-capable transmitting and/or receiving device 150, 160 advantageously has a unique address assigned thereto. The control and/or evaluation device of front adapter 5 is now adapted to control the transfer of signals between the second I/O contact elements $21_1$ to $21_n$ of the input and output module 12 of control device 10 and the wireless transmitting and/or receiving devices 185 and 195 and/or the bus-capable transmitting and/or receiving devices 150 and 160 in response to these addresses.

In order to be able to parameterize and/or configure the front adapter 5, an appropriate interface 60 is provided which is connected to the control and/or evaluation device 40. Interface 60 can be implemented as a wireless or wired interface in order to be able to forward, to the control and evaluation device 40, parameterization and configuration data coming from an external computer, for example.

In this way, the control and evaluation device 40 may, for example, be configured such that the output signals of control device 10 applied to the I/O contact element $20_1$ are transferred to the bus-capable transmitting and/or receiving device 150 and thus to actuator 130, while signals that are provided by the sensor 140 and are transmitted from the transmitting and/or receiving device 160 to the front adapter 5 are supplied to I/O contact element $20_n$, for example.

Similarly, the wireless transmitting and/or receiving devices 185 and 195 and the field units 180 and 190, respectively, may be assigned to a different predetermined second I/O contact element of input and output module 12 for transmitting signals from control device 10 to the actuator 130 and for transmitting signals from sensor 140 to the control device 10 via the front adapter 5.

Depending on the implementation, the front adapter 5 or the control and/or evaluation device 40 may furthermore add a unique address that is assigned to front adapter 5 to the output signals of the control device 10, which are intended for the actuator 190 or the actuator 130, in addition to the destination address of the respective actuator, which can be evaluated by the transmitting and/or receiving device 150 and 195, respectively. The destination addresses are evaluated in order to identify the receivers of the respective output signals, i.e. actuators 130 and 190, while the address of front adapter 5 is evaluated for identifying the latter.

Figure 2:
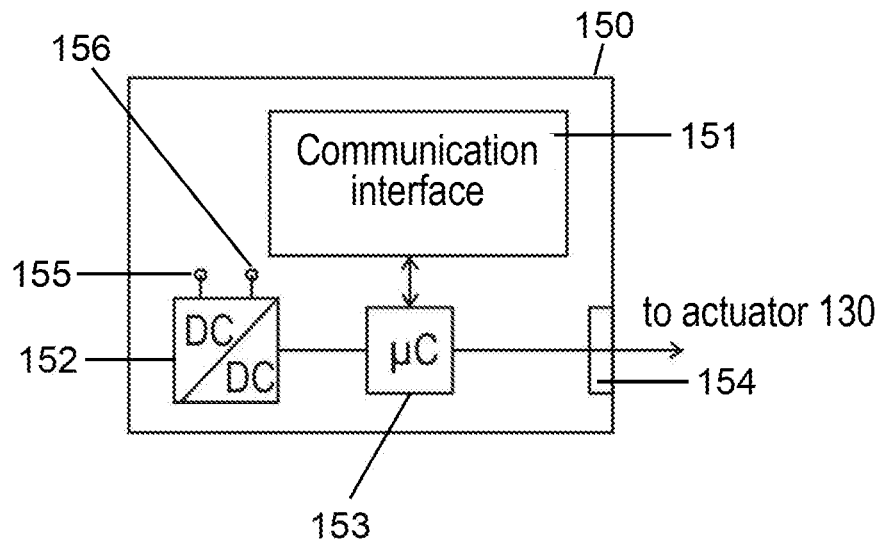
FIG. 2 shows a transmitting and/or receiving device shown in FIG. 1, which is adapted for bus-based communication.

For this purpose, the transmitting and/or receiving devices 150 and 195 may each have a control and/or evaluation device, which is shown in FIG. 2 with respect to the transmitting and/or receiving device 150 and is designated by reference numeral 153. Transmitting and/or receiving device 150 has a communication interface 151 which is configured as a bus-capable communication interface in the present example, to which the fieldbus 200 can be connected, for example. Alternatively, communication interface 151 might also be configured as a wireless communication interface which has a transmitting and/or receiving antenna or an optical transmitter and/or an optical receiver. Power supply of the transmitting and/or receiving device 150 may be achieved by an internal power supply source and/or via an external power supply source. FIG. 2 shows a connection device with two connection terminals 155, 156, by way of example, to which an external power supply source (not shown) can be connected, preferably a DC voltage source. The terminals are connected to a DC/DC converter 152 which supplies power to at least the control and/or evaluation device 153. Via interface 154, the transmitting and/or receiving device 150 may be coupled to the actuator 130, mechanically and electrically.

Transmitting and/or receiving device 160 may be configured similarly to the transmitting and/or receiving device 150. However, transmitting and/or receiving device 160 has an interface for being coupled to the sensor 140, mechanically and electrically. Furthermore, the transmitting and/or receiving device has a control and/or evaluation device which is adapted to transmit, to the front adapter 5, input signals as provided by sensor 140 for the control device 10, together with the address of the transmitting and/or receiving device 160 and with the address of front adapter 5, and the latter will supply the input signals to control device 10, via the respective second contact element.

Transmitting and/or receiving device 185 differs from transmitting and/or receiving device 160 essentially in that it is an integral part of the sensor 180 and that it has a wireless communication interface which may include a transmitting and/or receiving antenna or an optical transmitter and/or an optical receiver. Alternatively, the communication interface of transmitting and/or receiving device 185 may as well be configured as a bus-capable communication interface which is connectable to the fieldbus 200, for example. Sensor 180 and transmitting and/or receiving device 185 are electrically connected to each other and may be connected to a common power supply source.

Transmitting and/or receiving device 195 differs from transmitting and/or receiving device 150 essentially in that it is an integral part of the actuator 190 and that it has a wireless communication interface which may include a transmitting and/or receiving antenna or an optical transmitter and/or an optical receiver. Alternatively, the communication interface of transmitting and/or receiving device 195 may as well be configured as a bus-capable communication interface which is connectable to fieldbus 200, for example. Actuator 190 and transmitting and/or receiving device 195 are electrically connected to each other and may be connected to a common power supply source.

The operation of the automation system 1 shown in FIG. 1 and in particular the functionality of front adapter 5 will now be explained in more detail.

Assuming now that the control device 10 wants to effect a state change in actuator 190. Actuator 190 which is configured as a contactor, for example, shall close a switch. For this purpose, the I/O contact element $21_1$ which functions as a digital input pin, is set by the control device 10, for example. The control and evaluation device 40 recognizes that the contact element $21_1$ has been set, and transmits this digital signal together with the address of the transmitting and/or receiving device 195 and optionally with the address of the front adapter 5 via the wireless communication interface 71. The transmitting and/or receiving device 195 recognizes, from the address assigned to it, that the received digital signal is intended for itself and forwards this signal to the actuator 190 which then actuates the switch as specified by the control device 10.

Similarly, digital input signals may be transmitted from sensor 180 to the control device 10, for example. For this purpose, the data provided by the sensor 180 are transmitted via the wireless communication interface, together with the address of transmitting and/or receiving device 185 and the destination address of the front adapter 5, and are received by communication interface 71. The control and/or evaluation device 40 recognizes, based on the addresses transmitted together with the signal, that the signal is intended for front adapter 5 and has been transmitted by sensor 180. Control and/or evaluation device 40 knows that data coming from sensor 180 have to be forwarded to the digital input pin $21_n$ of control device 10. Consequently, the control and/or evaluation device 40 ensures that the received signal is supplied to the control device 10 via the second contact element $81_n$ and the input pin $21_n$, for further processing.

Similarly, output signals from control device 10, which are intended for the actuator 130, are transferred, via the respective I/O contact element of control device 10, to the control and/or evaluation device 40 which in turn transfers the output signal from control device 10 together with the address of front adapter 5 and the address of control and/or receiving device 150 via communication interface 70 and fieldbus 200 to the control and/or receiving device 150 and thus to the actuator 130. From the transmitted destination address, the control and receiving device 150 recognizes that the received output data come from control device 10 and are intended for the actuator 130.

Similarly, digital input signals may be transmitted from sensor 140 to the control device 10, for example. For this purpose, the data provided by sensor 140 are transmitted, together with the address of the transmitting and/or receiving device 160 and the destination address of the front adapter 5, via the bus-capable communication interface and the fieldbus 200 to the communication interface 70 of front adapter 5. The control and/or evaluation device 40 recognizes, from the addresses transmitted together with the signal, that the signal is intended for front adapter 5 and has been transmitted by sensor 140. The control and/or evaluation device 40 knows that data coming from the sensor 140 have to be forwarded to a specific input pin of the second I/O contact element, $21_1$ to $21_n$. Accordingly, the control and/or evaluation device 40 ensures that the received signal is supplied to the control device 10 via the respective second contact element and the respective input pin $21_n$, for further processing.

The invention claimed is:

1. A front adapter for connecting to a control device, comprising:
   a connection device connected to a predetermined system cable having a plurality of individual fibers or wires, for connecting at least one field component, the connection device having first contact elements, the individual fibers or wires of the predetermined system cable each connected to a respective one of the first contact elements;
   at least one wireless communication interface for wirelessly transmitting and receiving signals to or from at least one wireless for transmitting and/or receiving device that can be connected to a first field device and/or at least one bus-capable communication interface for transmitting and receiving signals via a signal bus to or from at least one bus-capable for transmitting and/or receiving device that can be connected to a second field device;
   a control and/or evaluation device connected to the at least one wireless communication interface and/or to the at least one bus-capable communication interface, and to second contact elements; and
   a housing encasing the connection device, the at least one wireless communication interface and/or the at least one bus-capable communication interface, and the control and/or evaluation device;
   wherein the front adapter is configured as a single plug-in connector with the first contact elements configured complementary to and electrically connectable to first I/O contact elements of an input/output assembly of the control device and the second contact elements configured complementary to and connectable to second I/O contact elements of the input and output assembly of the control device; and
   wherein the control and/or evaluation device is adapted to control the transfer of signals between the second I/O contact elements of the input and output assembly and the at least one wireless transmitting and/or receiving device and/or the at least one bus-capable transmitting and/or receiving device.

2. The front adapter of claim 1, wherein:

each wireless and/or bus-capable transmitting and/or receiving device has a unique address assigned thereto; and the control and/or evaluation device is adapted to control the transfer of signals between the second I/O contact elements of the input and output assembly and the at least one wireless transmitting and/or receiving device and/or the at least one bus-capable transmitting and/or receiving device in response to these addresses.

3. The front adapter of claim 1, wherein the at least one wireless communication interface is adapted for optical signal transfer or for wireless transfer, and the bus-capable communication interface is adapted for connecting a wired or glass fiber bound signal bus.

4. The front adapter of claim 1, further comprising an interface for parameterization and/or configuration of the front adapter.

5. The front adapter of claim 1, further comprising an internal power supply source and/or an interface for connecting an external power supply source.

6. An automation system, comprising:

the front adapter of claim 1, configured to be externally connectable to the control device;

the at least one wireless transmitting and/or receiving device connected to the first field device and adapted for wireless communication with the front adapter; and/or the at least one bus-capable transmitting and/or receiving device connected to the second field device and adapted for bus-based communication with the front adapter.

7. The automation system of claim 6, wherein the at least one wireless transmitting and/or receiving device and/or the at least one bus-capable transmitting and/or receiving device is arranged in a respective separate housing and is adapted to be externally connected to the respective field device assigned to it.

8. The automation system of claim 6, wherein the at least one wireless transmitting and/or receiving device and/or the at least one bus-capable transmitting and/or receiving device is implemented in the respective field device assigned to it.

9. The automation system of claim 6, wherein the first and/or second field device is implemented as an actuator or a sensor.

10. The automation system of claim 6, wherein the first and second field devices are not adapted to be connectable to the system cable.

11. The automation system of claim 6, further comprising field components adapted to be connected to the system cable.

* * * * *